United States Patent Office.

GEORGE CONROY, OF MENDOCINO COUNTY, CALIFORNIA, ASSIGNOR *for one half his right* TO ROBERT A. SMITH, OF SAME PLACE.

Letters Patent No. 95,771, dated October 12, 1869.

IMPROVED MEDICINE FOR RHEUMATISM.

The Schedule referred to in these Letters Patent and making part of the same.

To all whom it may concern:

Be it known that I, GEORGE CONROY, of Mendocino county, State of California, have invented an Improved Medicine for the Cure of Rheumatism; and I hereby declare the following to be a full and exact description of the same.

The above-named medicine is composed of the following ingredients, to wit, fruit of the buckeye, and the root of the Oregon wild grape.

Method of Preparing.

Take a quantity of the root of the Oregon wild grape; boil it in a kettle or other vessel, until the juice or sap is all extracted; then put in the hulled fruit of the ripe buckeye, and boil the buckeyes in the decoction until they are thoroughly cooked, and become soft, like a well-done potato; then pour the liquid (after straining) into a vessel containing clean hog's lard. The whole is then subjected to evaporation, until the liquid disappears, leaving an ointment, which I call "The Great California Cure for Rheumatism."

The following are the proportions in which the ingredients are combined:

One pound of grape-root to one gallon of water and four pounds of buckeyes. The decoction resulting from the above proportions to be added to three pounds of lard.

Manner of Application.

The patient is placed in a warm room, and the ointment rubbed on the parts affected. The application is to be made once a day, until a cure is effected.

What I claim, and desire to secure by Letters Patent, is—

The medicine for the cure of rheumatism, prepared of the materials herein described.

GEORGE CONROY.

Witnesses:
 THS. B. BOND,
 THOS. L. CAROTHERS.